United States Patent
Matt et al.

(10) Patent No.: US 6,269,156 B1
(45) Date of Patent: Jul. 31, 2001

(54) METHOD, SERVER AND COMMUNICATIONS NODE FOR SETTING UP FEE-OPTIMIZED COMMUNICATIONS CONNECTIONS

(75) Inventors: Hans Jürgen Matt, Remseck; Peter Sauer, Ditzingen; Rolf Kotthaus, Ludwigsburg, all of (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/335,179

(22) Filed: Jun. 17, 1999

(30) Foreign Application Priority Data

Jun. 19, 1998 (DE) .............................. 198 27 285

(51) Int. Cl.$^7$ .................................................. H04M 15/00
(52) U.S. Cl. ........................ 379/114; 379/114; 379/115; 379/221
(58) Field of Search .......................... 379/111–115, 121, 379/128, 133, 134, 201, 207, 219, 220, 221, 222, 227

(56) References Cited

U.S. PATENT DOCUMENTS

| | | | |
|---|---|---|---|
| 5,337,352 | | 8/1994 | Kobayashi et al. . |
| 5,425,085 | * | 6/1995 | Weinberger et al. ................ 379/112 |
| 5,473,630 | * | 12/1995 | Penzias et al. ....................... 379/114 |
| 5,515,425 | * | 5/1996 | Penzias et al. ....................... 379/114 |
| 5,570,417 | | 10/1996 | Byers . |
| 5,606,602 | * | 2/1997 | Johnson et al. ...................... 379/115 |
| 5,627,887 | | 5/1997 | Freedman . |
| 5,764,741 | * | 6/1998 | Barak ................................... 379/114 |
| 5,790,642 | * | 8/1998 | Taylor et al. ......................... 179/112 |
| 5,862,203 | * | 1/1999 | Wulkan et al. ....................... 379/114 |
| 5,870,460 | * | 2/1999 | Litzenberger ........................ 379/114 |
| 6,023,501 | * | 2/2000 | Wakamatsu .......................... 379/114 |
| 6,078,652 | * | 6/2000 | Barak ................................... 379/115 |
| 6,122,352 | * | 9/2000 | Kangas et al. ....................... 379/114 |
| 6,141,411 | * | 10/2000 | Robinson et al. .................... 379/221 |
| 6,188,756 | * | 2/2001 | Mashinsky ........................... 379/207 |

FOREIGN PATENT DOCUMENTS

| | | |
|---|---|---|
| 195 22 998 A1 | 1/1997 | (DE) . |
| 691 24 643 T2 | 5/1997 | (DE) . |
| 196 14 926 A1 | 10/1997 | (DE) . |
| 297 14 935 U1 | 2/1998 | (DE) . |
| 197 35 950 C1 | 4/1999 | (DE) . |
| 0 608 066 A2 | 7/1994 | (EP) . |
| 3-010261 | 3/1991 | (JP) . |
| WO 94/28683 | 12/1994 | (WO) . |
| WO 97/11553 | 3/1997 | (WO) . |

* cited by examiner

Primary Examiner—Curtis Kuntz
Assistant Examiner—Quoc Tran
(74) Attorney, Agent, or Firm—Sughrue, Mion, Zinn, Macpeak & Seas, PLLC

(57) ABSTRACT

A method for setting up fee-optimized communications connections by a communications device (EX1), a server for setting up fee-optimized communications connections and a communications node (EX1) therefor. The communications device provides a database, which stores the fees accruing during the use of the communications paths (CON2A, CON2B) that can be used for setting up a communications connection. A first subscriber (SUB1) then logs on a call request to a second subscriber (SUB2) at the communications device. The communications device then determines a communications path (CON2A) between the first and second subscriber according to the overall lowest fees and sets up a communications connection between the first and second subscriber on said communications path. For this purpose, it is proposed that the communications device determines the fees accrued by said communications connection and charges them to a subscriber.

11 Claims, 2 Drawing Sheets

METHOD, SERVER AND COMMUNICATIONS NODE FOR SETTING UP FEE-OPTIMIZED COMMUNICATIONS CONNECTIONS

This application is based on and claims the benefit of German Patent Application No. 198 27 285.5 filed Jun. 19, 1998, which is incorporated by reference herein.

BACKGROUND OF THE INVENTION

The present invention relates to a method according to the preamble of claim 1, a server according to the preamble of claim 8 and a communications node according to the preamble of claim 9.

Due to the deregulation of the telecommunications market, a subscriber, during the setup of a communications connection, can generally select from among communications paths of different telecommunications networks via which the communications connection to a communication partner can be set up. Selecting a code digit in addition to the subscriber number of the desired communications partner specifies a communications path in one of the telecommunications networks. The communications path can be selected, for example, based on where the lowest fees can be expected or based on where a desired transmission quality can be obtained. To be able to select a communications path based on the lowest fees one has to know what fees are being charged. Most recently, devices for private use have appeared on the market, which are inserted between a subscriber line of a telecommunications network and a subscriber terminal and which automatically establish the lowest cost communications connection to a communications partner. This feature is referred to as "least cost routing" and is available, for example, in many private telecommunications systems and in interface boxes that can be inserted between the subscriber line and a terminal. Such least cost routing devices have fee schedules stored in them, which the device uses to determine the respective fees and the code digit to be selected for different communications paths in order to set up the lowest cost communications connection. If the subscriber enters a subscriber number of a desired communications partner on his terminal, the terminal first transmits this subscriber number to the least cost routing device, which then determines the lowest cost communications path based on its fee schedule. The least cost routing device then sets up the desired communications connection by sending a call request with the code digit of the determined lowest cost communications path and the subscriber number of the desired communications partner to the subscriber line.

Many subscribers, however, do not have a least cost routing device. Consequently, such a subscriber will benefit from the lowest cost communications path only if he knows the fees of the possible communications paths and their respective code digits, determines the lowest cost communications path himself, and then enters the corresponding code digit in his terminal. Even the owner of a least cost routing device must put up with some inconvenience since the tariffs of the possible communications paths are frequently changed by their providers and the table stored in the least cost routing device must be updated with each tariff change. The owner must then inform himself of the tariffs in force and enter these tariffs in his least cost routing device.

SUMMARY OF THE INVENTION

The object of the invention is to set up communications connections at the lowest possible fees in a simple and convenient manner.

This object is attained by a method according to the technical teaching of claim 1, a server according to the technical teaching of claim 8 and a communications node according to the technical teaching of claim 9. Additional advantageous embodiments of the invention are set forth in the independent claims and the description.

BRIEF DESCRIPTION OF THE DRAWING

Below, the invention and its advantages are presented by means of an exemplary embodiment with the aid of the drawings.

DETAILED DESCRIPTION OF THE INVENTION

Figure 1:
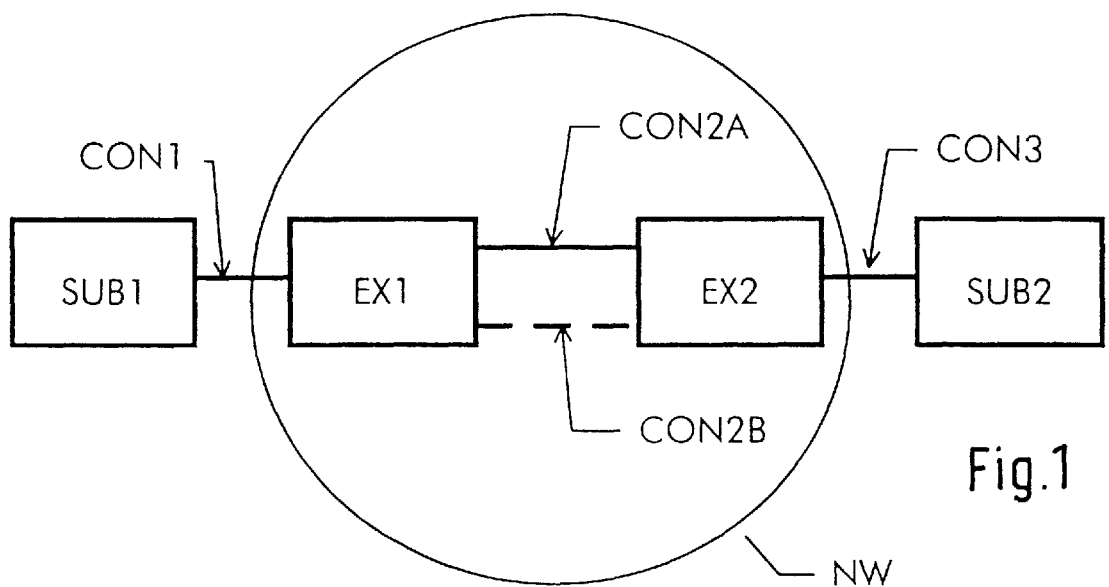
FIG. 1 shows an arrangement for implementing the inventive method comprising a terminal SUB1, a terminal SUB2, an inventive communications node EX1, and a communications node EX2.

FIG. 1 shows an arrangement for implementing the inventive method. From a terminal SUB1 of a first subscriber, a connection to a terminal SUB2 of a second subscriber is to be set up at the lowest possible fees. Both terminal SUB1 and terminal SUB2 are connected to a telecommunications network NW via subscriber lines (not depicted in FIG. 1). FIG. 1, however, shows a connection segment CON1, explained in further detail below, which runs via the subscriber line to terminal SUB1, and a connection segment CON3, also explained in further detail below, which runs via the subscriber line to terminal SUB2. Each of the subscriber lines is assigned a respective subscriber number. For simplicity's sake, the subscriber number assigned to the subscriber line of terminal SUB1 will hereinafter be referred to as "subscriber number of terminal SUB1," the subscriber number assigned to the subscriber line of terminal SUB2 will be referred to as "subscriber number of terminal SUB2." Terminals SUB1 and SUB2 can be, for example, telephone sets, fax devices, or personal computers with connection devices for a telecommunications network. The telecommunications network NW has, for example, a communications node EX1 and a communications node EX2 for additional elements (not depicted in FIG. 1). The communications nodes EX1 and EX2 can be interconnected via two alternative communications paths CON2A or CON2B, which will be described in further detail below. The communications paths CON2A or CON2B can run through various devices, connecting lines and subnetworks of telecommunications network NW (not depicted in FIG. 1). Telecommunications network NW may be formed, for example, of a telecommunications network of a public network operator, leased lines, and telecommunications networks of private network operators, which can be line-bound telecommunications networks or cellular networks. Between terminals SUB1 and SUB2, a communications connection may be established, which runs through the connecting segment CON1, the communications node EX1, the communications path CON2A or the communications path CON2B to communications node EX2 and from there through connecting segment CON3. This communications connection is not shown in FIG. 1. Since the communications connection, however, runs through said connecting segments, all of which include the abbreviation "CON" in their reference symbol, this communications connection, for simplicity's sake, will hereinafter be referred to as "communications connection CON."

If a communications connection is to be established between terminal SUB1 and terminal SUB2, a connection is set up first from terminal SUB1 to a communications node EX1 on connection segment CON1. For this purpose, the subscriber number of terminal SUB2 as well as an identifier of communications node EX1 as a prefix are entered in terminal SUB1. By means of this prefix, the telecommunications network NW can first set up connection segment CON1 to communications node EX1 starting from the subscriber line of terminal SUB1 via devices and connecting lines of telecommunications NW (not depicted), e.g. front-end equipment, a local switching center, and possibly additional switching exchanges, up to communications node EX1. To log on the desired communications connection CON from terminal SUB1 to terminal SUB2 at communications node EX1, communications node EX1 is given the subscriber number of terminal SUB2 as the connection destination and, in addition, the subscriber number of terminal SUB1 as the connection source, e.g. by means of a signaling message from the Central ITU-T Signaling Set No. 7 or, if connection segment CON1 is maintained on a line of an ISDN telecommunications network, by means of a message on the D channel of this line.

As may be seen from FIG. 1, the desired communications connection CON can be set up from communications node EX1 via the alternative communications paths CON2A and CON2B to communications node EX2 and from there to terminal SUB2. Communications path CON2A can, for example, run through a line-bound telecommunications network, communications path CON2B through a cellular network or through a DECT telecommunications network ( Digital European Cordless Telecommunication). For simplicity's sake, the devices of these telecommunications networks, e.g. switching exchanges and connecting lines, are not depicted in FIG. 1. There may also be a direct connection between communications node EX1 and communications node EX2, e.g., a bus for a plurality of communications connections, through which communications path CON2A can also run. In addition to the two communications paths CON2A and CON2B, there may be other alternative communications paths (not depicted in FIG. 1) between communications nodes EX1 and EX2.

Figure 2:
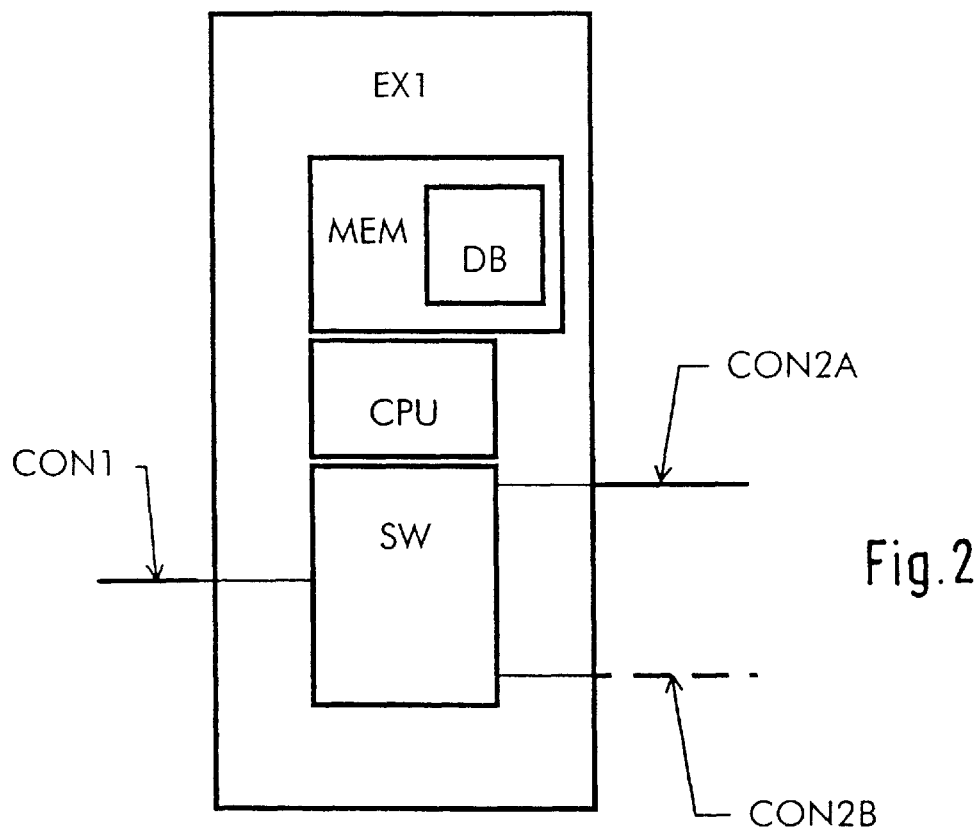
FIG. 2 shows an inventive communications node EX1 comprising control means CPU, a memory MEM and a switching device SW.

To describe the mode of operation of communications node EX1 in further detail, the essential components of communications node EX1, namely a switching device SW, control means CPU, and a memory MEM will be explained by means of FIG. 2. Connection segment CON1 known from FIG. 1 opens out into communications node EX1 and runs within communications node EX1 up to switching device SW. From switching device SW, a connection can be established from connection segment CON1 to communications path CON2A or communications path CON2B, both of which lead out of communications node EX1 and are known from FIG. 1. Switching device SW can be, for example, a switching network of a switching exchange, which is controlled by control means CPU. Control means CPU can be, for example, a processor that executes programs stored in memory MEM. Also stored in memory MEM in a database DB are communications path tables indicating the communications paths that can be used from communications node EX1 and the respective fees charged for their use. Control means CPU, memory MEM, and switching device SW are interconnected, respectively, by connections that are not depicted in FIG. 2.

The communications path tables stored in database DB are regularly updated by communications node EX1. Communications node EX1, for example, queries the operators of communications paths CON2A and CON2B regarding the respectively applicable tariffs or communications node EX1 analyzes the respective fees accrued during the communications connections set up by it in order to determine the tariffs on the communications connection.

With reference to the components shown in FIG. 2 of communications node EX1—switching device SW, control means CPU, and memory MEM—the further processing of a call request from terminal SUB1 to terminal SUB2 is described below by means of FIG. 1. After communications node EX1 receives the call request from terminal SUB1 to terminal SUB2, communications node EX1 determines on which communications paths terminal SUB2 can be reached. For this purpose, control means CPU evaluates the communications path tables stored in database DB and first determines that terminal SUB2 can be reached via two alternative communications paths CON2A and CON2B, communications node EX2, and connection segment CON3. Control means CPU then consults the communications path tables to determine through which of the two communications paths CON2A and CON2B terminal SUB2 can be reached at the overall lowest fees. Control means CPU may, for example, determine communications path CON2A to be the lowest cost communications path because upon receipt of the call request, the tariff on communications path CON2A is lower than on communications path CON2B. Beyond considering the tariffs on communications paths CON2A and CON2B, communications node EX1 also includes the fees charged on the connection segments CON1 and CON3 in its determination of the lowest cost communications path. For example, if terminal SUB1 is a terminal for a line-bound telecommunications network, terminal SUB2 a terminal for a cellular network, and communications path CON2B and connection segment CON3 are parts of this cellular network, communications node EX1 may select, for example, communications path CON2B as part of a communications connection CON at the overall lowest fees for the further connection setup since particularly high fees are charged in the transition from a line-bound telecommunications network to a cellular network for the gateway. Communications node EX1 provides such a gateway with its interface to the line-bound telecommunications network toward connection segment CON1 and with its interface to the cellular telecommunications network toward communications path CON2B. Communications node EX1 can thus establish communications connection CON at a particularly low cost. Comparable to the gateway to the cellular network, communications node EX1 can also obtain convenient access to the aforementioned bus for terminal SUB1 if communications connection CON is possible via this bus at the overall lowest fees. Typically, such a bus cannot be conveniently selected directly from a terminal and included in a communications connection.

To determine the overall lowest fees for the communications connection CON, a table can be stored in memory MEM of communications node EX1, which indicates the average duration of connections coming from terminal SUB1. Control means CPU can then calculate by means of the communications path table what fees accrue during such an average connection and thus select the lowest cost communications path CON2A or CON2B. Considering the average duration of a connection is advantageous, for example, if special fee discounts are granted on a communications path for connections of different length or if the fees change starting from a certain time during the use of a communications path. Communications node EX1, instead of using average values of connection periods to calculate the expected fees, can also ask terminal SUB1 for the expected connection duration. For this purpose, communications node EX1 after receiving the call request for the communications connection CON sends, for example, a voice announcement with such an inquiry on connection segment CON1 to terminal SUB1. From terminal SUB1, the expected connection duration can then be indicated to communications node EX1 as in-band signaling, for example, by means of DTMF signals (DTMF=Dual Tone Multi Frequency).

In the exemplary embodiment, communications node EX1 includes communications path CON2A in the desired communications connection CON to terminal SUB2 because control means CPU has determined communications path CON2A to be the lowest cost communications path for a communications connection CON. Consequently, in FIG. 1, communications path CON2A is represented by a solid line and communications path CON2B by a dashed line.

If communications path CON2A is part of a direct bus between communications node EX1 and communications node EX2, communications node EX1 can occupy a channel of this bus from its side for the further setup of the desired communications connection CON. Communications node EX1 then sends communications node EX2 an order on this channel to complete the connection up to terminal SUB2. Communications node EX2 then sets up the connection segment CON3 to terminal SUB2 so that terminal SUB1 and terminal SUB2 are interconnected. If communications path CON2A runs through a subnetwork of telecommunications network NW, communications node EX1 adds, for example, a code digit to the subscriber number of terminal SUB2 and provides this code digit together with the subscriber number to telecommunications network NW for the further setup of the desired communication link CON, e.g., via the aforementioned Central Signaling Set No. 7. Telecommunications network NW then completes the setup of communications connection CON between terminal SUB1 and terminal SUB2 via communications path CON2A, communications node EX2 and communications segment CON3. If communications path CON2A runs through several subnetworks of telecommunications network NW, communications node EX1 gives telecommunications network NW identifications for each subnetwork together with the subscriber number of terminal SUB2, which telecommunications network NW can then use to set up communications path CON2A via these subnetworks. After communications connection CON between terminal SUB1 and terminal SUB2 has been set up and is used by terminals SUB1 and SUB2, communications node EX1 determines the fees accruing during the use of communications connection CON, that is, the fees on connection segments CON1 and CON3 and on communications path CON2A. For this purpose, the aforementioned subnetwork of telecommunications network NW, which in the above example runs through communications path CON2A, sends communications node EX1 charging pulses, which control means CPU of communications node EX1 can cumulate and charge to one of the subscribers of communications connection CON, typically to the subscriber calling with terminal SUB1, by entering them in memory MEM. Control means CPU can also charge the entirety of the charging pulses to the subscriber called via terminal SUB2 or proportionally to the subscriber calling with terminal SUB1 and the subscriber called via terminal SUB2. To settle the accrued fees, memory MEM can subsequently be read out.

However, communications node EX1 can also send the determined fees accrued by communications connection CON directly to a processing unit of telecommunications network NW (not depicted in FIG. 1) after communications connection CON has been disconnected. In addition to the fees determined by communications node EX1, such a processing unit can also store, for example, fees metered by other devices of telecommunications network NW so that an invoice for all fees accrued within telecommunications network NW can later be prepared.

The services of communications node EX1 can be provided as special services at no cost to the subscribers of communications node EX1. But the use of communications node EX1 can also be provided for a fee. Communications node EX1, in addition to the fees accrued for using communications connection CON, can furthermore charge the subscriber of terminal SUB1, for example, a processing fee for determining the communications path based on the overall lowest fees. Such a processing fee can be a flat fee or a variable fee, for example, based on the cost savings obtained by communications node EX1 due to the selection of the respectively lowest cost communications path.

If the duration of the communications connection CON exceeds a scheduled duration or a duration formed from average values, the fees actually accrued for communications connection CON may exceed the pre-calculated fees, e.g., because a higher tariff applies on communications path CON2A starting from a certain time. Or the tariff on communications path CON2B may be below the rate applicable on communications path CON2A starting from a certain time. By means of its communications path table, communications node EX1 can determine such a rate change and note it in its memory MEM, for example, for statistical purposes. It is advantageous, however, if such a rate change is indicated to the subscriber of communications connection CON. At least the subscriber to whom the fees accrued for communications path CON are charged will be interested in a rate change. If the fees are charged, for example, to the subscriber on terminal SUB1, communications node EX1 can send a message with the actually applicable rates on connection segment CON1 to terminal SUB1 or indicate a lower cost connection option, e.g., by means of a voice announcement or a signal tone. If connection segment CON1 is part of an ISDN telecommunications network, such a message can also be transported on an ISDN D channel in the context of user-to-user signaling as offered by the DSS1 protocol for ISDN telecommunications networks as the feature "user-to-user signaling during connection" also known under the abbreviation "UUS3." Terminal SUB1 can indicate the content of such a UUS3 message, e.g., on a display.

In response to the receipt of such a message, the subscriber on terminal SUB1 can, for example, terminate communications connection CON if the rates have increased and the subscriber does not want to be charged the higher rates. After termination of communications connection CON, the subscriber can have a new communications connection set up to terminal SUB2 by ordering communications node EX1 to set up again a communications connection at the lowest possible fees. Communications node EX1 can then include, for example, the alternative communications path CON2B in the new communications connection.

But communications connection CON may not have to be terminated before communications path CON2A or CON2B can be used for communications connection CON to provide the respectively lowest fees. After communications node EX1 has determined an alternative communications path, e.g., communications path CON2B, communications node EX1 can switch between communications paths CON2A and CON2B during communications connection CON, e.g., by occupying both communications paths CON2A and CON2B in parallel for a transition phase and then switching seamlessly from one communications path to the other. Communications node EX1 can also execute such a switch automatically if specified, e.g., by a corresponding entry for terminal SUB1 in memory MEM.

In either case, however, automatic switching may not be desirable for a subscriber, e.g. because communications connection CON might be briefly interrupted or disturbed during switching or because communications connection CON is in any case to be terminated shortly after detection of the switching option. In this case, communications node EX1 has an indication in its memory, for example, that switching between communications paths is to occur only after receipt of an order. Such an order can be sent to communications node EX1 by one of the terminals SUB1 or SUB2 as an order message, in the form of a signal giving communications node EX1 the order to switch. The order message can be sent to communications node EX1, for example, by means of said in-band signaling with DTMF signals.

A further option results if communications node EX1 determines for a call request originating from terminal SUB1 to terminal SUB2 that the desired communications connection CON to terminal SUB2 can be set up at particularly low cost if communications connection CON between terminal SUB1 and terminal SUB2 is not set up by communications node EX1 but by communications node EX2 in the form of a so-called "callback" function. Communications node EX1 then first sends communications node EX2 a message ordering it to set up communications connection CON and simultaneously indicates on which communications path CON2A or CON2B this can be accomplished at the lowest cost. Communications node EX1 then terminates the connection with terminal SUB1 on communications connection CON1. Communications node EX2 then sets up the desired communications connection CON between terminal SUB2 and terminal SUB1 as instructed on one of the communications paths CON2A or CON2B. If the unit fees accrued by communications connection CON are transmitted to communications node EX1, communications node EX1 can determine the unit fees in this case as well and charge the fees to one of the two subscribers.

In a particularly simple but efficient embodiment of the invention, it is not even necessary that there are two alternative communications paths CON2A and CON2B between communications node EX1 and communications node EX2 to execute the aforementioned "callback" function but possibly only one communications path, e.g., communications path CON2A. In such a case, communications node EX1 can first determine whether the desired communications connection CON can be established in principle on communications path CON2A and then determine whether communications path CON2A can be used at the overall lowest fees if it is addressed from communications node EX2. Communications node EX1 then sends an order for setting up the communications connection CON to communications node EX2. As described above, communications node EX2 then set ups the desired communications connection CON between terminal SUB2 and terminal SUB1 on communications path CON2A. The unit fees accrued are transmitted to communications node EX1, which charges them to one of the two subscribers.

In addition to the expected fees on a communications path, communications node EX1 can also include the expected transmission quality on the respective communications path in its selection of the respective lowest cost communications path. For this purpose, a parameter for the transmission quality can be entered in the communications path table in addition to the fees for each of the communications paths. If a desired minimum transmission quality is specified for a subscriber line, for example by an entry in memory MEM, e.g., for the subscriber line of terminal SUB1, communications node EX1 will possibly not select communications path CON2A as the most suitable communications path for communications connection CON, as in the above example, but communications path CON2B because only communications path CON2B offers the desired minimum transmission quality. A desired minimum transmission quality can also be specified to communications node EX1 together with the logon of a call request. After terminal SUB1 is connected with communications node EX1 via connection segment CON1 as in the connection setup of the previous example, communications node EX1 can prompt terminal SUB1, e.g. by means of a voice announcement, to enter a desired transmission quality. Terminal SUB1 can then specify a transmission quality to communications node EX1, e.g., in the context of in-band signaling with DTMF signals. If number "1," for example, is pressed on a key pad of terminal SUB1 and terminal SUB1 transmits a DTMF signal corresponding to this number key to communications node EX1, switching exchange EX11 can determine, for example, that a very good transmission quality is desired. Analogously, communications node EX1 can determine from a DTMF signal corresponding to number key "3" that an average transmission quality is sufficient. Communications node EX1 sets up communications connection CON according to the specified transmission quality.

Figure 3:
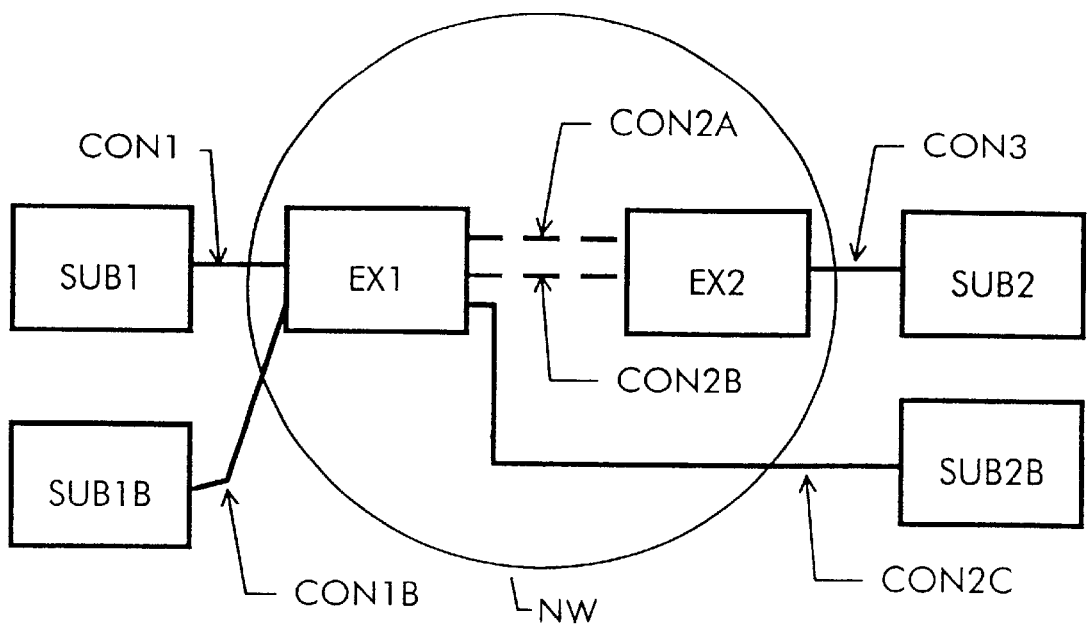
FIG. 3 shows an arrangement for implementing the inventive method comprising a terminal SUB1, a terminal SUB2, a terminal SUB2B, an inventive communications node EX1 and a communications node EX2.

FIG. 3 shows the components known from FIG. 1, which fulfill the functions known from FIG. 1 and therefore carry identical reference symbols in both figures. In addition, however, FIG. 3 shows a terminal SUB2B, which can be reached from communications node EX1 via a communications path CON2C. FIG. 3 furthermore shows a terminal SUB1B and a connection segment CON1B, which will be further explained below. Terminal SUB2B is connected with telecommunications network NW by its own subscriber line whose course is indicated by communications path CON2C. Terminal SUB2B is owned by the same subscriber, hereinafter referred to as subscriber B, who also owns terminal SUB2. For example, terminal SUB2 can be a terminal for a line-bound telecommunications network and terminal SUB2B a terminal for a cellular network. This subscriber B can thus be reached from terminal SUB1 via either terminal SUB2 or terminal SUB2A. This alternative reachability of subscriber B is indicated in the communications path table in database DB of communications node EX1. Communications path CON2C, like communications paths CON2A and CON2B, can run through different subnetworks of telecommunications network NW, e.g. via a cellular network if terminal SUB2B is a terminal for a cellular network. If terminal SUB1 logs on a call request to terminal SUB2 at communications node EX1, communications node EX1 can include fees charged on communications path CON2C in addition to the fees charged on communications paths CON2A and CON2B when determining the lowest cost communications path. If the fees on communications path CON2C are lower than those on communications paths CON2A or CON2B, communications node EX1 sets up the desired connection to terminal SUB2A instead of terminal SUB2.

Like subscriber B, the subscriber calling with terminal SUB1, hereinafter referred to as subscriber A, can also own an alternative terminal SUB1B in addition to his terminal SUB1. Terminal SUB1B is connected via a subscriber line with telecommunications network NW. The course of this subscriber line is indicated by connection segment CON1B between terminal SUB1B and communications node EX1. Like the alternative reachability of subscriber B via terminals SUB2 and SUB2B, the alternative usability of terminals SUB1 and SUB1B by subscriber A is also indicated in the communications path table in database DB of communications node EX1. If subscriber A logs on a call request from his terminal SUB1 to terminal SUB2 at communications node EX1, communications node EX1 can determine by means of its communications path table that there is an alternative connection between terminals SUB1B and SUB2B at lower cost than the requested connection between terminals SUB1 and SUB2 by considering all the connection segments and communications paths that may be involved in the call request. Communications node EX1 communicates this to subscriber A, e.g., by a voice announcement, then terminates the connection on connection segment CON1 to terminal SUB1 and, instead of setting up the connection between SUB1 and SUB2, sets up a connection between terminals SUB1B and SUB2B. The fees caused by this latter connection and those possibly caused by the previous connection on connection segment CON1 are calculated in the aforementioned manner and charged to one or both subscribers. If subscriber B does not own alternative terminals SUB2 and SUB2B as in the previous example but only a single terminal SUB2, communications node EX1, for a call request originating from terminal SUB1 to terminal SUB2, may determine that subscriber A can be connected via his alternative terminal SUB1B with terminal SUB2 at the overall lowest fees. It can then set up a connection in the above-described manner between terminal SUB1B and terminal SUB2 and determine and charge the accruing fees.

Figure 4:
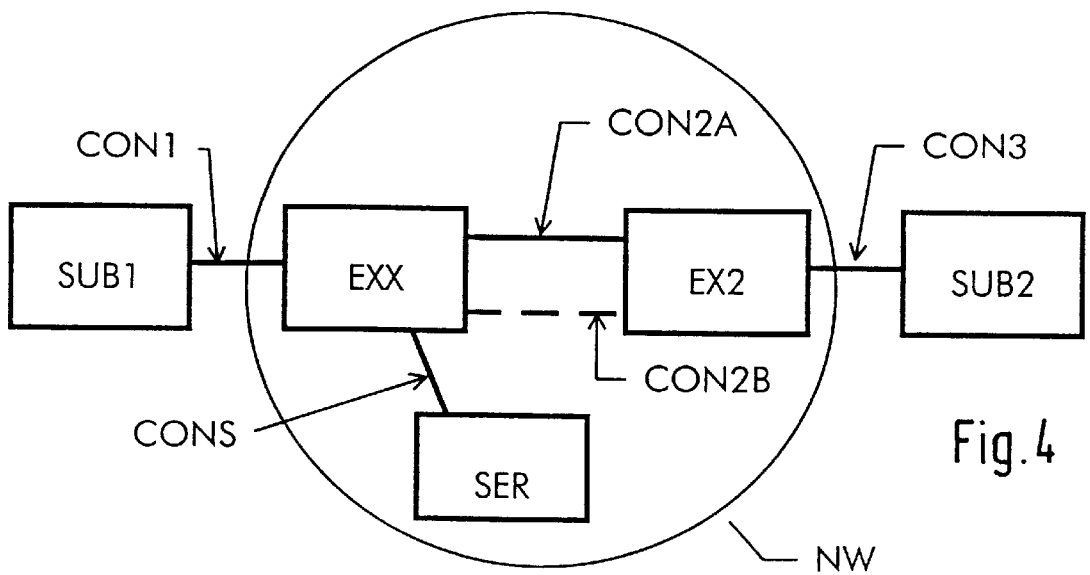
FIG. 4 shows an arrangement for implementing the inventive method comprising a terminal SUB1, a terminal SUB2, a communications node EXX, an inventive server SER and a communications node EX2.

Instead of the inventive communications node EX1, a conventional switching exchange typical in telecommunications networks can be used, which interacts with an inventive server. FIG. 4 shows such a switching exchange identified as switching exchange EXX, which is connected with an inventive server SER via a connection CONS. The other components depicted in FIG. 4 are identical to the components of the same name known from FIG. 1 and thus need not be further explained. Switching exchange EXX can, for example, be a so-called SSP (Service Switching Point) and server SER a SCP (Service Control Point) of an Intelligent Network (IN), which communicate with each other via connection CONS by means of the previously mentioned Central ITU-T Signaling Set No. 7. Server SER can also be a computer component that is integrated in switching exchange EXX and connected via an internal proprietary interface with switching exchange EXX. Like communications node EX1, server SER also has control means CPU, a memory MEM, and a database DB in which communications path tables are stored. These communications path tables indicate the communications paths that can be used by switching exchange EXX, e.g., communications paths CON2A and CON2B in FIG. 4. If terminal SUB1 logs on a call request to terminal SUB2 at switching exchange EXX, switching exchange EXX first transfers this call request to server SER. Server SER then determines the lowest cost communications connection between terminals SUB1 and SUB2 and, depending on the result, sends a message to switching exchange EXX ordering it to continue to set up the desired connection via either communications path CON2A or communications path CON2B. The fees accruing due to the connection between terminals SUB1 and SUB2, which reach switching exchange EXX, for example, in the form of charging pulses or billing messages, are than forwarded by switching exchange EXX to server SER. Server SER cumulates them and charges them to one or both of the subscribers involved in the connection as described above.

What is claimed is:

1. A method for setting up fee-optimized communications connections by a communications device (EX1) including the steps of:

providing a database (DB) of the communications device wherein fees are stored that accrue during use of communications paths (CON2A, CON2B) which the communications device uses for setting up a communications connection;

logging on at the communications device of a call request by a first subscriber (SUB1) to a second subscriber (SUB2);

determining a first communications path (CON2A) between the first and the second subscriber based on overall lowest fees as a criterion;

setting up a communications connection between the first and the second subscriber on said first communications path;

determining the fees accrued by said communications connection;

determining a second, more cost-effective communications path (CON2B) between the first and the second subscriber according to the criterion of overall lowest fees if the fees that accrue on the first communications path change during the connection;

switching to the second communications path either by a request from the first or second subscriber or using other criteria; and charging the accrued fees by the communications device to at least one of the two subscribers.

2. A method according to claim 1 characterized in that the option of switching to the second communications path is indicated to at least one of the two subscribers.

3. A method according to claim 1, wherein the database of the communications device, in addition to the fees, stores a transmission quality of the communications paths that the communications device uses to set up a communications connection, in that for a call request, a desired transmission quality of the call request is selected and in that the first communications path between the first and the second subscriber is determined based on a criterion of the desired transmission quality as well as on the criterion of the overall lowest fees.

4. A method according to claim 1 wherein, if the first or the second subscriber can be reached via communications paths that lead to different terminals, the communications device determines that communication path between those terminals by which the first and the second subscriber can be connected at the overall lowest fees.

5. A server (SER) for setting up fee-optimized communications connections, said server including a database wherein fees are stored which accrue during use of communications paths (CON2A, CON2B) that at least one communications node (EXX) can use to set up a communications connection, said server further including:
- means that are set up such that a first subscriber (SUB1) can log on a call request to a second subscriber (SUB2);
- means to determine a first communications path (CON2A) between the first and the second subscriber according to overall lowest fees as a criterion;
- means to order a setup of a communications connection between the first and the second subscriber on said first communications path;
- means to determine the fees being accrued by said communications connection;
- means to determine a second, more cost-effective communications path (CON2B) between the first and the second subscriber according to the criterion of overall lowest fees if the fees that accrue on the first communications path change during the connection;
- a switch for switching to the second communications path either by a request from the first or second subscriber or using other criteria; and
- means to charge the accrued fees to at least one of the two subscribers.

6. A communications node (EX1) for setting up fee-optimized communications connections, said communications node including a database (DB) wherein fees are stored which accrue during use of the communications paths (CON2A, CON2B) that the communications node can use to set up a communications connection, said communications node further including:
- means with which a first subscriber (SUB1) can log on a call request to a second subscriber (SUB2);
- means to determine a first communications path (CON2A) between the first and the second subscriber according to overall lowest fees as a criterion;
- means for setting up a communications connection between the first and the second subscriber on said first communications path;
- means to determine the fees being accrued by said communications connection;
- means to determine a second, more cost-effective communications path (CON2B) between the first and the second subscriber according to the criterion of overall lowest fees if the fees that accrue on the first communications path change during the connection;
- a switch for switching to the second communications path either by a request from the first or second subscriber or using other criteria; and
- means to charge the accrued fees to at least one of the two subscribers.

7. A communications node according to claim 6 wherein the communications node comprises means for sending and means for receiving messages on at least one signaling channel on which messages are exchanged with a conventional signaling set used between switching exchanges of a telecommunications network.

8. A method for setting up fee-optimized communications connections by a communications device (EX1) including the steps of:
- providing a database (DB) of the communications device wherein fees are stored that accrue during use of communications paths (CON2A, CON2B) which the communications device uses for setting up a communications connection;
- logging on at the communications device of a call request by a first subscriber (SUB 1) to a second subscriber (SUB2);
- determining a first communications path (CON2A) between the first and the second subscriber, wherein if the first or second subscriber can be reached via communications paths that lead to different terminals, the communications device determines that communication path between those terminals of said different terminals, by which the first and second subscriber can be connected at overall lowest fees;
- setting up a communications connection between the first and the second subscriber on said first communications path;
- determining the fees accrued by said communications connection; and
- charging the accrued fees by the communications device to at least one of the two subscribers.

9. A server (SER) for setting up fee-optimized communications connections, said server including a database wherein fees are stored which accrue during use of communications paths (CON2A, CON2B) that at least one communications node (EXX) can use to set up a communications connection, said server further including:
- means that are set up such that a first subscriber (SUB1) can log on a call request to a second subscriber (SUB2);
- means to determine a first communications path (CON2A) between the first and the second subscriber, wherein if the first or second subscriber can be reached via communications paths that lead to different terminals, the communications device determines that communication path between those terminals of said different terminals, by which the first and second subscriber can be connected at overall lowest fees;
- means to order a setup of a communications connection between the first and the second subscriber on said first communications path;
- means to determine the fees being accrued by said communications connection; and
- means to charge the accrued fees to at least one of the two subscribers.

10. A communications node (EX1) for setting up fee-optimized communications connections, said communications node including a database (DB) wherein fees are stored which accrue during use of the communications paths (CON2A, CON2B) that the communications node can use to set up a communications connection, said communications node further including:
- means with which a first subscriber (SUB1) can log on a call request to a second subscriber (SUB2);
- means to determine a first communications path (CON2A) between the first and the second subscriber, wherein if the first or second subscriber can be reached via communications paths that lead to different terminals, the communications device determines that communication path between those terminals of said different terminals, by which the first and second subscriber can be connected at overall lowest fees;
- means for setting up a communications connection between the first and the second subscriber on said first communications path;
- means to determine the fees being accrued by said communications connection; and
- means to charge the accrued fees to at least one of the two subscribers.

11. A communications node according to claim 10 wherein the communications node comprises means for sending and means for receiving messages on at least one signaling channel on which messages are exchanged with a conventional signaling set used between switching exchanges of a telecommunications network.

* * * * *